3,118,896
PROCESS FOR MAKING 3-QUINUCLIDINYL BENZILATE
John A. Pianfetti, William L. Johnson, and Edward F. Orwoll, Baltimore, Md., assignors to FMC Corporation, New York, N.Y., a corporation of Delaware
No Drawing. Filed June 13, 1962, Ser. No. 202,086
5 Claims. (Cl. 260—294.3)

This invention relates to a process for preparing the benzilic acid ester of 3-quinuclidinol (1-azabicyclo [2-2-2]-3-octanol) described in the Sternbach U.S. Patent 2,648,667, issued August 11, 1953, as a useful spasmolytic.

The difficulty of esterifying aminoalcohols in good yields is well known in the art; and this is complicated when complex hydroxy acids such as benzilic acid ($Ph_2$—C(OH)—COOH) are involved. It has been suggested that yields can be improved both by reacting a lower alkyl ester of the acid with a catalytic amount of an alkali metal alcoholate of the aminoalcohol (Hill et al. U.S. Patent 2,394,770—February 12, 1946), or by completely reacting the lower alkyl ester of the acid with molar equivalents of alkali metal to produce the alkali metal derivative, and using this reaction product to esterify the aminoalcohol (Farkas et al. U.S. Patent 2,843,593—July 15, 1958).

Each of the suggested processes of the prior art, while quite feasible on a laboratory scale, presents serious difficulties in plant production. Each of the processes involves the handling of substantial quantities of alkali metal, which is extremely difficult to work with outside of the laboratory, especially where the reactants and products involved are expensive or dangerous to handle.

Moreover, these processes utilize considerable excess of one or the other reactant to get desired yields. Hill et al. use large excesses of their alcohols; Farkas et al. use a substantial (50%) excess of methyl benzilate. This is undesirable unless one of the reactants is inexpensive and easy to recover.

Additionally, the Farkas procedure, while giving excellent yields, presents still another serious problem—that of recovery of the finished ester. The reaction mixture is treated with hydrochloric or other acid to form the water soluble acid salt, and the acid solution is separated from the hydrocarbon used to conduct the esterification. When this acid solution is neutralized, a gummy mass is formed; Farkas et al. extracts this with chloroform and recrystallizes.

This invention has as its principal object the provision of a process for producing the benzilic acid esters of 3-quinuclidinol in good yields, which will avoid the difficulty and expense of handling metallic sodium with expensive and dangerous materials, and will produce the ester in finished form without the need of expensive solvent extraction and recrystallization.

These and other objects are obtained, in accordance with this invention, by simultaneously reacting 3-quinuclidinol, a lower alkyl benzilate, and an alkali metal salt of a lower alcohol in approximately equimolar proportions, in a hydrocarbon carrier at the boiling point, and distilling off the free alcohol formed in the reaction. The product is recoverable in substantially pure, readily filterable form, by extraction with aqueous acid followed by neutralization by adding the acid solution to aqueous alkali (preferably to alkali metal carbonate) solution at a pH of 8–11.5.

The reaction mechanism is not completely understood. In the absence of 3-quinuclidinol, the alkali metal alcoholate will not react with the benzilate ester to form predominantly the sodio-derivative, although alcohol is eliminated probably by a process of self-condensation of the methyl benzilate. When sodium methylate and methyl benzilate in xylene were reacted with elimination of methanol, and 3-quinuclidinol was then added, no ester was formed in contrast to the process of Farkas et al. in which the sodio-derivative of methyl benzilate is undoubtedly formed as a first step.

The benzilate ester is preferably the methyl or ethyl ester, although other lower alkyl esters may be used. The methyl and ethyl esters are preferred because of original cost, and because of cost savings in elimination of the alcohol by distillation. The same reasoning applies to the alkali-metal alcoholates, sodium methylate or sodium ethylate being the reagent of choice.

Equal molar proportions of the reactants give excellent yields, in the 80 to 90% range. Moderate excess of either the alcohol or the benzilate may be used, improving yields somewhat based on the minor ingredient. However, since both of these reactants are expensive, a large excess of either material should be avoided.

The alcoholate, being somewhat less expensive, can be used in amount ranging from 0.9–1.4 mols per mol of alcohol. The use of substantially less alcoholate reduces yields; and there appears to be no advantage in using more than about 40% above equimolar proportions.

The reaction is run in a hydrocarbon medium capable of azeotroping the alcohol produced from the transesterification and the alcoholate. Preferably, for cost reasons, the lowest boiling and cheapest hydrocarbon is used which will perform this function. Heptane is the preferred material with the methyl ester and sodium methylate although other aliphatic or aromatic hydrocarbons of suitable distillation range may be used. With sodium ethylate, toluene is an excellent diluent, being available in pure form at a low price.

The transesterification is carried out at the reflux temperature of the mixture, under conditions permitting azeotroping of the alcohol formed. With heptane, methyl benzilate and sodium methylate, initial reflux occurs at about 60° C., with the final temperature rising to about 95° C. If desired, the process can be hastened by the use of slight vacuum to hasten the removal of alcohol. However, since a typical transesterification takes only about 30 minutes, there is little incentive for doing so.

After transesterification, aqueous acid is added to extract the product from the reaction mixture as an acid salt. The aqueous acid layer is separated from the hydrocarbon. The ester can be precipitated from the aqueous acid solution with sodium hydroxide to give an agglomerate which can be ground, filtered and washed. Preferably, the grinding step is eliminated by adding the acid solution to aqueous alkali metal carbonate containing an excess over one mol of carbonate per mol of acid used for the extraction at a pH of about 8 to 11.5, whereby a fine precipitate is obtained which filters well.

The following typical examples of the invention are given by way of illustration and not by way of limitation.

*Example 1*

A 4 ft. x ½ inch column packed with glass helices and equipped with reflux and back pressure controls was used. An equimolecular mixture of 3-quinuclidinol (6.4 g., 0.05 M) and methyl benzilate (12.1 g., 0.05 M), and a 5% excess of sodium methylate (2.9 g., 0.0525 M) was added to 150 ml. heptane to form a mobile slurry. The mixture was heated and distilled. The azeotropic distillate boiled at 58° C. and separated into two approximately equal (by volume) phases. The reaction was completed in 30 minutes, judged by homogeneous overhead at 91° C. The volume of the methanol phase in the distillate was about 4 ml.

Extraction with 125 ml. of 1 N hydrochloric acid after cooling the mixture showed only two liquid layers. The acid layer, causticized to pH 11 with aqueous sodium hydroxide, gave an 84% yield of the desired ester. The acid layer on neutralization precipitated a thick semi-solid or gel agglomerate which quickly hardened and crystallized. The suspension of solidified product was ground in a mortar and filtered. The melting point was 164–165° C. and the analysis was 95% by acid titration.

*Example 2*

Example 1 was repeated several times and the aqueous acid extract in each case was obtained as or adjusted to, a solution containing 13 grams of ester, 3 grams of NaCl, and 200 grams of 0.75 N HCl. These solutions were precipitated as follows.

(A) The solution was added slowly to 100 ml. of water containing 15 grams of sodium carbonate. The pH changed slowly from 11 to 7, and was then raised to 9 by the addition of sodium hydroxide. A fine precipitate which filtered fairly well was obtained. M.P. 164–168° C.—a very satisfactory product.

(B) "A" was repeated, except that a few crystals of an anionic surfactant ("All") and of product were dropped into the sodium carbonate solution before adding the acid solution. Results were similar—the fine product had a melting point of 164–166° C.

(C) A solution of 8 grams $NaHCO_3$ in 100 ml. of water was prepared, and the acid solution was added to it slowly along with NaOH solution to regulate the pH. At pH 12, the product obtained was similar to the product of Example 1, and required grinding before filtration.

(D) "C" was rerun several times, at pH ranging down from 12. Fine crystalline precipitates were obtained at pH 11, 10, 9 and 8.

*Example 3*

In the equipment utilized for Example 1, a mixture of 300 ml. of heptane and 6.4 g. (0.05 mol) of 3-quinuclidinol was stirred and heated until 5 ml. of clear distillate was removed to assure dryness. To the cooled mixture were added 12.1 g. (0.05 mol) of methyl benzilate and 4.0 g. (0.07 mol) of sodium methylate. The mixture was heated and distilled over a period of 1.5 hours, until a total of 10.5 ml. of distillate was removed. The volume of the lower methanol phase of the distillate was 3.5 ml. After cooling, 75 ml. of water, then 75 ml. of 2-N-hydrochloric acid were added to the reaction mixture. The clear aqueous phase was separated and added over a period of one hour to 53 g. (0.05 mol) of sodium carbonate in 300 ml. of water at a temperature of 60° C. (final pH 10.5). The slurry filtered readily, and the residue was washed with water and dried to yield 13.1 g. (78% of the theoretical amount) of quinuclidinyl benzilate, melting at 164–165° C.

*Example 4*

The same equipment was used as in Example 1. 0.1 mol of methyl benzilate, 0.10 mol of 3-quinuclidinol, and 0.12 mol of sodium ethylate were added to 300 ml. of toluene, and the mixture was heated to reflux, until pure toluene was recovered overhead, which took about 30 minutes. The solution was cooled and extracted with 250 ml. of 1 N hydrochloric acid. The hydrochloric acid extract was slowly dropped into a solution of 35 g. of sodium carbonate solution at 60–70° C. with agitation over a period of two hours. The slurry obtained was cooled, filtered, washed with water and dried. A 75% yield was obtained; M.P. 163–166° C.

Obviously, the examples can be multiplied indefinitely without departing from the scope of the invention as defined in the claims.

What is claimed is:

1. The process for making the benzilic acid ester of 3-quinuclidinol which comprises heating to reflux in a hydrocarbon diluent approximately equimolar amounts of 3-quinuclidinol, a lower alkyl ester of benzilic acid and at least 0.9 mole of an alkali metal lower alcoholate per mole of 3-quinuclidinol, removing the lower alcohols by distillation, and separating the benzilic acid ester of 3-quinuclidinol so produced from the hydrocarbon by treatment with dilute aqueous acid to produce an aqueous solution of the acid salt of the ester.

2. The process of claim 1, in which methyl benzilate, sodium methylate and heptane are used.

3. The process of claim 1, in which methyl benzilate, sodium ethylate and toluene are used.

4. The process of claim 1, in which the ester is precipitated in filterable form by addition of its solution in aqueous acid to an alkaline solution in an amount sufficient to give a final pH of 8–11.5.

5. The process of claim 1, in which the alkali metal lower alcoholate is present in an amount of 0.9–1.4 moles per mole of 3-quinuclidinol.

References Cited in the file of this patent

UNITED STATES PATENTS 2,843,593     Farkas et al. _____ July 15, 1958